United States Patent [19]

Mann

[11] Patent Number: 5,628,488
[45] Date of Patent: May 13, 1997

[54] FLEXIBLE ISOLATION MOUNT

[76] Inventor: James A. Mann, 9045 Ron-Den La., Windermere, Fla. 34786

[21] Appl. No.: 345,858

[22] Filed: Nov. 28, 1994

[51] Int. Cl.$^6$ .................................................. F16M 13/00
[52] U.S. Cl. ........................ 248/610; 248/323; 248/605; 248/638
[58] Field of Search ................................ 248/610, 605, 248/634, 638, 323, 317, 324, 339; 294/149, 150–160, 163, 167, 27.1

[56] References Cited

U.S. PATENT DOCUMENTS

| | | | |
|---|---|---|---|
| 809,356 | 1/1906 | Brown | 248/610 |
| 1,202,745 | 10/1916 | Lindner | 248/323 |
| 1,305,198 | 5/1919 | Deubener | 294/149 X |
| 1,468,881 | 9/1923 | Lewis et al. | 248/610 X |
| 1,617,279 | 2/1927 | Tower | 248/323 |
| 1,938,478 | 12/1933 | Bailer | 294/152 X |
| 2,541,449 | 2/1951 | Vickers | 294/149 |
| 3,184,204 | 5/1965 | Dachinger | 248/323 |
| 3,912,214 | 10/1975 | Karass | 248/323 |
| 4,101,109 | 7/1978 | Edwards | 248/317 |
| 4,227,669 | 10/1980 | McInnis | 248/317 |
| 4,417,714 | 11/1983 | Charm | 248/323 |
| 4,520,979 | 6/1985 | McInnis | 248/323 |
| 4,928,914 | 5/1990 | Snodell | 248/274 |
| 5,179,367 | 1/1993 | Shimizu | 248/323 X |
| 5,344,109 | 9/1994 | Hokoana, Jr. | 248/339 X |
| 5,368,270 | 11/1994 | Wiwczar | 248/610 |
| 5,529,362 | 6/1996 | Gidos | 294/151 |

FOREIGN PATENT DOCUMENTS

| | | | |
|---|---|---|---|
| 508207 | 7/1920 | France | 248/317 |
| 929446 | 6/1955 | Germany | 248/324 |
| 1919916 | 5/1970 | Germany | 294/149 |
| 1196309 | 6/1970 | United Kingdom | 248/610 |

*Primary Examiner*—Alvin C. Chin-Shue
*Assistant Examiner*—Anita M. King
*Attorney, Agent, or Firm*—Maguire, Voorhis & Wells, P.A.; Robert L. Wolter

[57] ABSTRACT

A flexible isolation mount for suspending a motor unit having a motor housing and a mounting bracket attached to the housing to reduce the sound and vibration of the motor. A mounting base is bolted to the bracket securing a flexible belt intermediate the mounting block and bracket. The belt has two loops that extend beyond the periphery of the mounting base and are folded over the base to form a flexible handle. A hook means attached to a support frame engages the flexible handle for an isolation mount.

17 Claims, 2 Drawing Sheets

FLEXIBLE ISOLATION MOUNT

FIELD OF THE INVENTION

This invention relates generally to mounting units for suspension and isolation of motors and the like, and more specifically to the isolation mounting units used to isolate overhead ventilation and water motors as fogging units in propagation, maintenance and protection of plant life from heat and frost.

BACKGROUND OF THE INVENTION

Fogging units are used in plant nurseries for propagation, maintenance, and protection of plant life, from heat and frost by mounting the fog unit to an existing overhead structure or on light tripods for open field crops. The use of multiples of smaller fractional horsepower fogging units conserve water by using less water and dispersing fog more efficiently over a larger area than conventional wet pads and larger units. Several small overhead fog units can enhance the performance of existing conventional wet pads and create several isolated micro-climates in a single area if necessary.

The fogging units generate a centrifugal atomized mist of water to form a fine blanket of fog over plants to avoid damage during freezing temperatures. Most mounting mechanisms used to suspend and isolate fogging units are rigid frames that are mounted directly to a support, or oscillating units, which are fixed to the support. The frames are usually constructed of aluminum or stainless steel to avoid rusting. For this reason the vibration of the motor and oscillator create a great deal of noise. In addition, the units are cumbersome, difficult to assemble and to adjust the horizontal pitch or attitude of the fogging unit.

SUMMARY OF THE INVENTION

It is the general aim of this invention to provide an easily assembled flexible isolation mounting unit. It is the further object of this invention to provide such flexible isolation mount that is also easily adjustable to control the pitch of a motor unit. Yet another object of this invention is to provide a flexible isolation belt for mounting a ventilation or fogging motor to reduce the sound and vibration level of the fogging motor.

These and other objectives and goals are achieved by utilizing a flexible belt mount looped around a motor mount on a fogging unit and hooked to a means for suspending the motor from a fixed support frame or an oscillator motor. A flexible belt is secured intermediate the fogging unit and a base bolted to the fogging motor. Two loops on the flexible belt extend beyond the periphery base and are folded over the base to engage an eye hook bolt secured to a support frame. The pitch of the motor may be adjusted by loosening just two bolts of the base attachment, and adjusting the belt to reduce the length of one loop and decrease the length of the other loop. This enables a user to adjust the angle of the longitudinal or cross-sectional axis of the fogging unit with respect to a horizontal plane of the fogging unit.

DETAILED DESCRIPTION OF THE INVENTION

Figure 1:
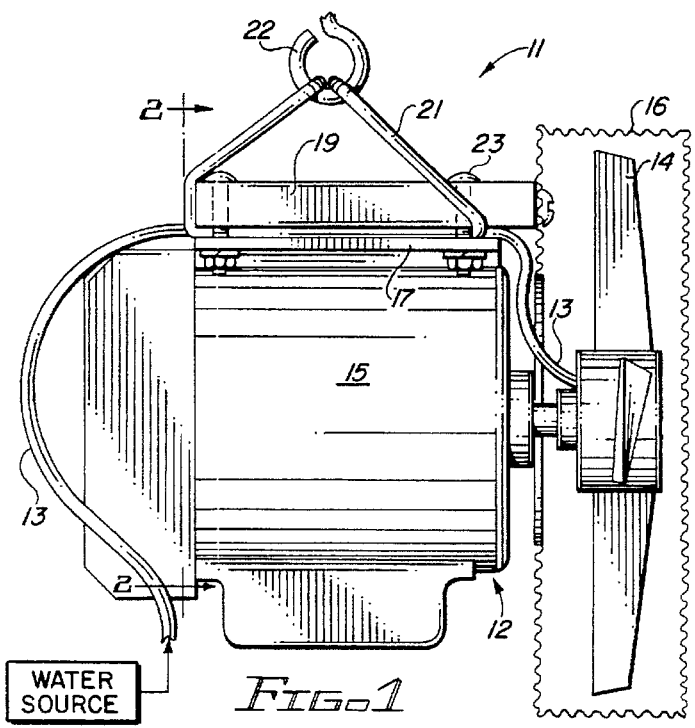
FIG. 1 is a side elevational view of a fogging unit with the flexible isolation mount.

The flexible isolation mount 11, illustrated in FIG. 1, suspending a fogging unit 12 from an eye hook bolt 22 thus is attached to an oscillator or overhead structure (not shown). Such a fogging unit generally includes a motor housing 15 with a motor for rotation of the shaft 25. An impeller 14 is mounted to the end of a shaft 25, and a guard 16, mounted to a base 19, surrounds the impeller 14. A water line 13, connected to a remote water source, provides water under pressure and is introduced into the impeller 14 to provide fog generated by centrifugal force. The water line is secured by clamping pressure between base 19 and motor bracket 17. The longitudinal axis of the motor in the embodiment described in this disclosure is perpendicular to the impeller 14 and guard 16. The cross-sectional axis of the motor is perpendicular to the longitudinal axis.

The flexible isolation mount is ideally utilized with one-half horse power micro-foggers, that weigh less than twenty (20) pounds. Although the disclosure of this invention teaches the use of the invention as it relates to micro-fogging units, this invention is not limited to such use of a flexible isolation mount, but may include the use of this isolation mount to any motor unit that may require an isolated or suspended mount.

Figure 3:
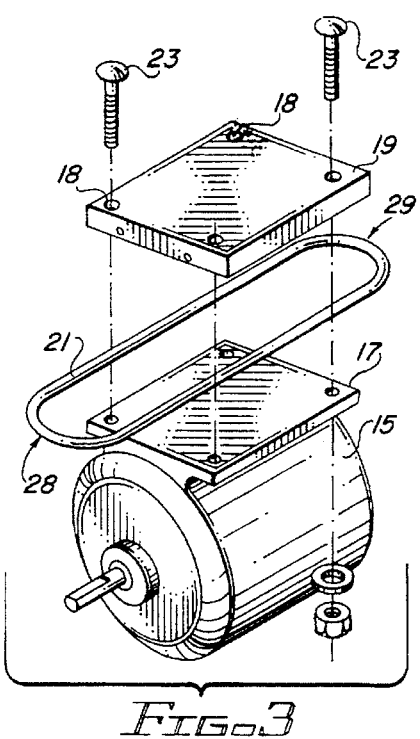
FIG. 3 is a perspective view of the flexible isolation mount disassembled.
Figure 2:
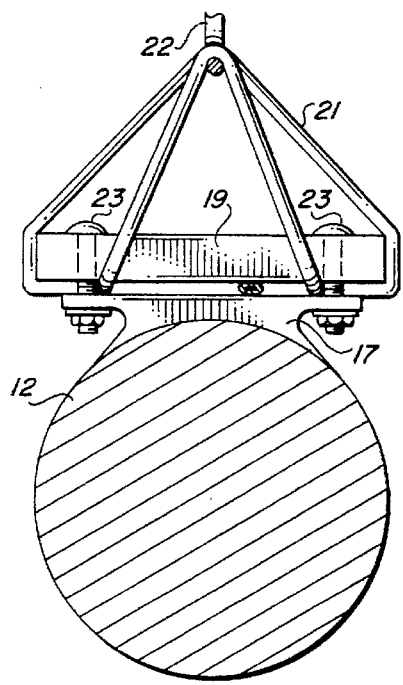
FIG. 2 is a rear elevational view of FIG. 1.

As shown in FIGS. 1–3, the flexible isolation mount includes a flexible belt 21 connected to the fogging unit by a mounting base 19 bolted to bracket 17 on the motor housing 15. The mounting base 19 has bolt holes 18 that are aligned with the holes 27 of the bracket 17. Bolts 23 secure the base 19 to the bracket 17 so the flexible belt 21 is compressed and tightly held between the base 19 and bracket 17. The flexible belt 21 used with the one-half horse power fogging units, has a one-quarter inch square cross section, that will support up to three hundred pounds.

The flexible belt 21 is compressed between the base 19 and motor housing 15. A loop 28 extends beyond the periphery of base 19 facing the impeller 14, and a loop 29 extends beyond the end of the base 19 facing the rear of the motor housing opposite loop 28. The loops 28 and 29 are folded over the block to form a flexible handle and engage a support frame. The loops 28 and 29 engage the eye hook bolt 22 which is bolted either directly to a support frame or tripod (in an open field) or connected to an oscillator which is secured to a support structure, as a ceiling or tripod, suspending the motor overhead.

As the motor unit is activated, the operation of the impeller 14 creates a thrust through the motor. The impeller 14 also causes a centrifugal force that causes torsional movement of the motor. In the embodiment shown in FIGS. 1–3 and FIGS. 6–7, the loop 29 is folded over the rear end of the base 19 and legs 31 & 32 of loop 28 are pulled around the bolts and folded over the sides of the base 19 to form a flexible handle for the fogging unit. The loop 29 folded over the end of the base counters thrust from the motor and loop 28 folded over the sides counters motor torque as it is running.

Figure 4:
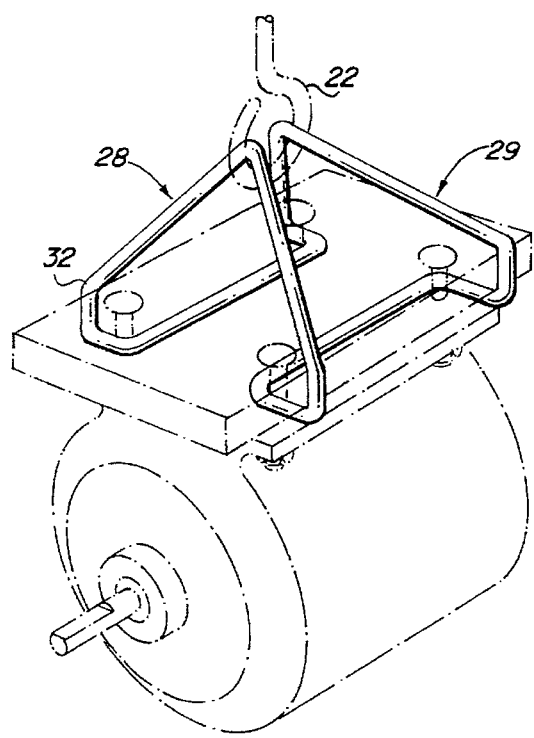
FIG. 4 is a perspective view of a first embodiment of the invention illustrating the belt folded over each side of the motor mounting base.
Figure 6:
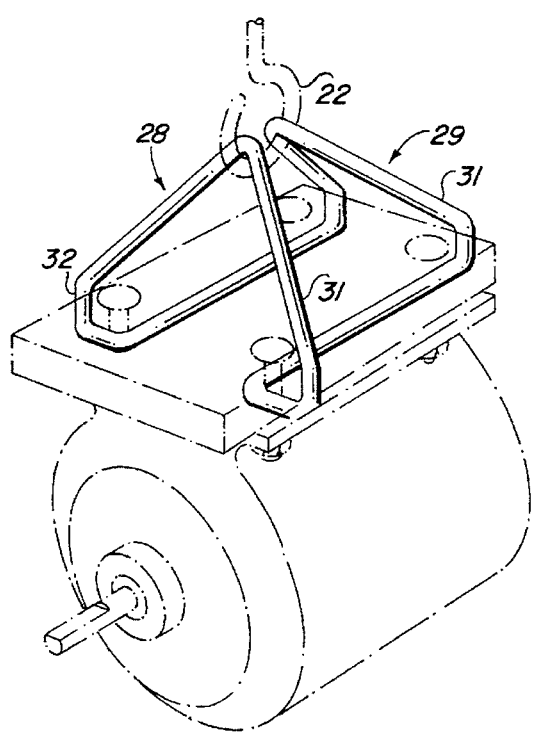
FIG. 6 is a perspective view of a fogging unit with second embodiment of the invention.
Figure 5:
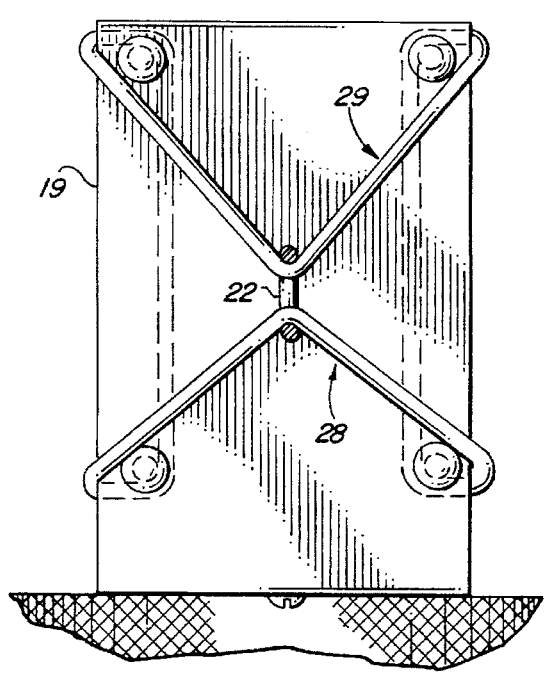
FIG. 5 is a top view of the invention depicted in FIG. 4.
Figure 7:
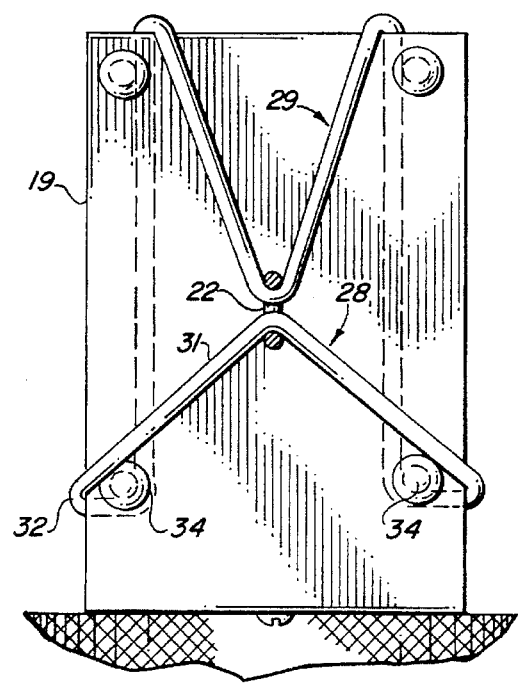
FIG. 7 is a top elevational view of the second embodiment of the invention depicted in FIG. 6.

In the embodiment illustrated in FIGS. 4–5, the leg 31 and 32 of each loop 28 and 29 is folded over a side of the base 19. This particular embodiment achieves a maximum motor torque resistance and permits a slight vertical oscillation of the motor for maximum fog dispersal.

Figure 8:
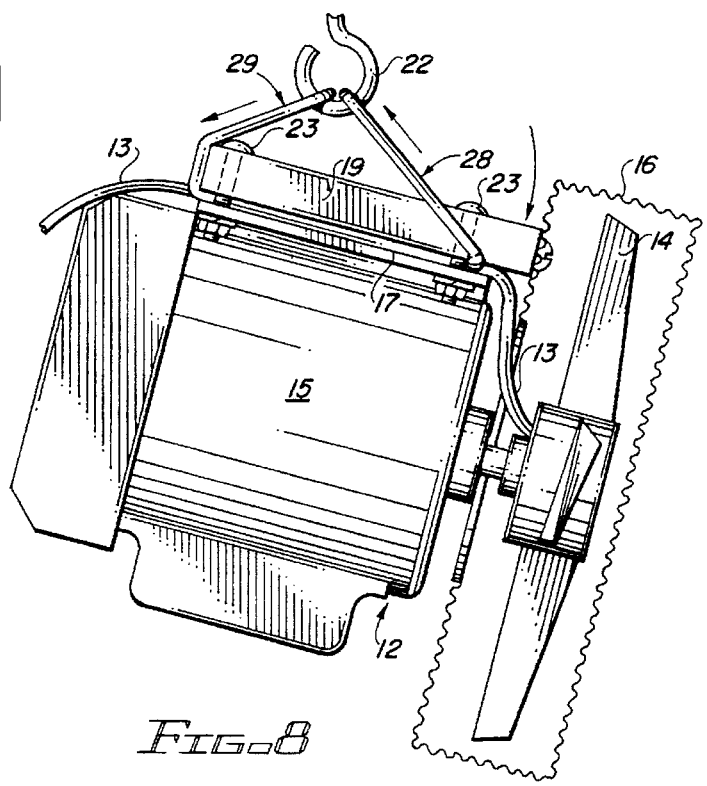
FIG. 8 is a side elevational view of a fogging unit with the flexible isolation mount adjusted so the longitudinal axis of the fogging unit extends at an angle below horizontal.

When using the flexible mount belt 21 for isolation of fogging units, it is necessary to provide means for adjustment of the horizontal attitude or pitch of the motor. This may be especially critical with fogging units to control the angle of dispersion of the water mist across a fixed area. In FIG. 8 the longitudinal axis of the unit 12 has been adjusted to an angle below horizontal. This is accomplished by simply loosening two bolts 23 and pulling the belt toward the impeller 14 to increase the length of loop 28 and correspondingly decrease the length of loop 29. The belt is pulled in the opposite direction to adjust the longitudinal axis of the unit 12 to an angle above horizontal.

While this specification discloses the best mode contemplated for carrying the present invention, it will be apparent that modifications or variations may be made without departing from what is regarded to be the subject matter of the invention as set forth in the appended claims.

What I claim is:

1. A flexible isolation mount suspending a motor unit from a support frame with said motor unit having a housing, said isolation mount comprising:
   (a) a flexible belt attached to said motor housing;
   (b) first means, attached to said motor housing, for engagement with said belt whereby said belt forms a flexible handle, said first engagement means includes a support mounting base affixed to the motor housing such that said belt is secured intermediate the support mounting base and the motor housing having a first and second loop in the belt extending beyond the periphery of the support mounting base and folded over said support mounting base; and,
   (c) second means, fixed to said support frame, for engagement with the handle to suspend the motor unit from the support.

2. A flexible isolation mount as defined in claim 1 further including means, connected to said first engagement means, for adjustment of the pitch of said motor unit.

3. A flexible isolation mount as defined in claim 2 wherein said pitch adjustment means includes the support mounting base having a means, connected to the housing and mounting base for selectively displacing the mounting base with respect to the motor housing to loosen the belt and alter the length of the first loop or second loop for adjustment of the pitch of the motor unit.

4. A flexible isolation mount as defined in claim 3 wherein said selective displacement means includes a plurality of bolts securing the support mounting base to said motor housing for adjustment of the support mounting base along the longitudinal axis of the bolts with respect to the motor housing.

5. A flexible isolation mount as defined in claim 1 wherein said mounting base is a rectangular block having two sides parallel to the longitudinal axis of the motor and two ends perpendicular to the longitudinal axis of the motor, and said first loop has two legs folded over an end of the block and the second loop has two legs with each leg of the second loop folded over opposing sides of the block.

6. A flexible isolation mount as defined in claim 1 wherein said support mounting base is a rectangular block with two sides parallel to the longitudinal axis of the motor and two ends perpendicular to the longitudinal axis of the motor, and said first loop of the flexible belt having two legs folded over opposing sides of the rectangular block and said second loop has two legs folded over opposing sides of the rectangular block.

7. A flexible isolation mount suspending a motor unit from a support frame to said motor unit having a housing with a mounting bracket, said isolation mount comprising:
   (a) a motor unit having a mounting bracket and a mounting base fixed to the mounting bracket;
   (b) a flexible belt secured between said mounting base and said mounting bracket, extending beyond the periphery of the base, folded over the mounting base and forming a handle for suspension of the motor unit;
   (c) engagement means, attached to said support frame, for engagement with said handle; and,
   (d) means, interconnecting said mounting base and mounting bracket, for adjusting the pitch of said motor unit.

8. A flexible isolation mount as defined in claim 7 wherein said flexible belt includes two end loops in said flexible belt extending beyond the periphery of the mounting base with each said loop folded over the mounting base to form the handle from which the motor unit is suspended.

9. A flexible isolation mount as defined in claim 8 wherein said pitch adjustment means includes means for selectively displacing the mounting base with respect to the motor housing.

10. A flexible isolation mount as defined in claim 9 wherein said selective displacement means includes a plurality of bolts securing said mounting base to said motor mounting bracket for selective adjustment of the base with respect to the motor housing to loosen said loops for adjustment of the pitch of the motor unit.

11. A flexible isolation mount for suspending a motor from a support frame, said motor having a housing, said isolation mount comprising:
   (a) a motor unit having a motor mount fixed to a motor housing wherein said motor mount includes a mounting bracket fixed to the motor housing and a mounting base bolted to the motor mounting bracket.
   (b) a flexible belt extending intermediate the mounting base and motor housing and folded around the motor mount to form a flexible handle; and
   (c) hook means, attached to the support frame for engagement with the handle for suspension of the motor.

12. A flexible isolation mount as defined in claim 11 further including means, connected to said mounting base and bracket, for selectively displacing the mounting base with respect to the motor housing to loosen the belt and to adjust the pitch of the motor unit.

13. A flexible isolation mount as defined in claim 11 wherein said mounting base is a rectangular block bolted to the bracket, the mounting block having two ends perpendicular to the longitudinal axis of the motor and two sides parallel to the longitudinal axis of the motor, such that said belt extends intermediate to the mounting block and bracket, and said belt having two end loops, one said loop folded over an end of the block and the other said loop having two legs each folded over opposing sides of the block.

14. A flexible isolation mount including a motor unit suspended from a support frame with said motor unit having a mounting bracket with a mounting base fixed thereon, and a flexible belt extending intermediate said base and motor unit folded over the base to form a handle with said handle suspended from an engagement means on the support frame, wherein said mounting base includes a rectangular block fixed to the mounting bracket and having two sides parallel to a longitudinal axis of the motor unit and two ends perpendicular to a longitudinal axis of the motor unit and said flexible belt having a first end loop and a second end loop with each said end loop having two legs and each leg of the first end loop folded over one of the rectangular block and each leg of the second end loop folded over opposing sides of the rectangular block.

15. A flexible isolation mount as defined in claim 14 wherein the first loop is folded over an end of the block and each leg of the second end loop is folded over an opposing side of the block.

16. A flexible isolation mount, comprising:
 (a) a motor unit having a housing and a mounting base attached to the housing;
 (b) a flexible belt extending intermediate the mounting base and motor unit and attached to the mounting base for suspending the motor unit from an overhead structure; and
 (c) means, connected to said mounting base, for selectively displacing the mounting base with respect to the housing of the motor unit to loosen and adjust the length of the flexible belt for adjustment of the pitch of the motor unit.

17. A flexible isolation mount as defined in claim 16 wherein said flexible belt includes a first flexible loop section and a second flexible loop section in the belt and folded over the mounting base and engaging the overhead structure to suspend the motor unit from the overhead structure.

* * * * *